(12) United States Patent
Srivastava et al.

(10) Patent No.: US 11,301,406 B2
(45) Date of Patent: Apr. 12, 2022

(54) METHOD, APPARATUS AND SYSTEM FOR ROLE TRANSFER FUNCTIONALITY FOR A BUS MASTER

(71) Applicant: Intel Corporation, Santa Clara, CA (US)

(72) Inventors: Amit Kumar Srivastava, Penang (MY); Duane G. Quiet, Hillsboro, OR (US); Kenneth P. Foust, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1207 days.

(21) Appl. No.: 15/237,928

(22) Filed: Aug. 16, 2016

(65) Prior Publication Data

US 2018/0052791 A1    Feb. 22, 2018

(51) Int. Cl.
| | |
|---|---|
| *H04W 84/20* | (2009.01) |
| *G06F 13/364* | (2006.01) |
| *G06F 1/3234* | (2019.01) |
| *G06F 1/3287* | (2019.01) |
| *G06F 1/3296* | (2019.01) |
| *G06F 13/42* | (2006.01) |

(52) U.S. Cl.
CPC .......... *G06F 13/364* (2013.01); *G06F 1/3253* (2013.01); *G06F 1/3287* (2013.01); *G06F 1/3296* (2013.01); *G06F 13/4282* (2013.01); *Y02D 10/00* (2018.01); *Y02D 30/50* (2020.08)

(58) Field of Classification Search
None
See application file for complete search history.

(56) References Cited

U.S. PATENT DOCUMENTS

| | | | |
|---|---|---|---|
| 6,748,548 B2 | 6/2004 | Bormann et al. | |
| 2002/0124198 A1* | 9/2002 | Bormann | G06F 1/3215 713/323 |
| 2004/0128571 A1* | 7/2004 | Saunders | G06F 1/3215 713/300 |
| 2006/0005060 A1* | 1/2006 | Bibikar | G06F 1/26 713/330 |
| 2007/0093198 A1* | 4/2007 | Beckers | H04W 48/16 455/1 |
| 2008/0069021 A1* | 3/2008 | Chhabra | H04M 1/7253 370/311 |
| 2010/0169523 A1 | 7/2010 | Dunstan et al. | |

FOREIGN PATENT DOCUMENTS

WO    2016094320    6/2016

OTHER PUBLICATIONS

U.S. Appl. No. 15/198,027, filed Jun. 30, 2016, entitled "Method, Apparatus And System For Dynamic Optimization Of Signal Integrity On A Bus," by Duane G. Quiet, et al.
International Searching Authority, "Notification of Transmittal of the International Search Report and the Written Opinion of the International Searching Authority," dated Nov. 2, 2017, in International application No. PCT/US2017/043430.

* cited by examiner

*Primary Examiner* — Hyun Nam
(74) *Attorney, Agent, or Firm* — Trop, Pruner & Hu, P.C.

(57) ABSTRACT

In an embodiment, a host device includes: a transceiver to communicate information on an interconnect; a controller to control operation of the transceiver and to be a master for the interconnect; and a role transfer logic to cause a secondary device to be the master for the interconnect when at least a portion of the host device is to enter into a low power. Other embodiments are described and claimed.

10 Claims, 7 Drawing Sheets

METHOD, APPARATUS AND SYSTEM FOR ROLE TRANSFER FUNCTIONALITY FOR A BUS MASTER

TECHNICAL FIELD

Embodiments relate to operations and power management of multi-drop bus structures.

BACKGROUND

Many different types of known buses and other interfaces are used to connect different components using a wide variety of interconnection topologies. For example, on-chip buses are used to couple different on-chip components of a given integrated circuit (IC) such as a processor, system on a chip or so forth. External buses can be used to couple different components of a given computing system either by way of interconnect traces on a circuit board such as a motherboard, wires and so forth.

A recent multi-drop interface technology is an Improved Inter Integrated Circuit (I3C) Specification, expected to become available from the Mobile Industry Processor Interface (MIPI) Alliance™ (www.mipi.org). This interface is expected to be used to serially connect devices, such as internal or external sensors or so forth, to a host processor, applications processor or standalone device via a host controller or input/output controller. One issue with implementations of interfaces such as this is power consumption, as a variety of devices seek to reduce power consumption while still providing ready access to included components. Yet power management is typically beyond the scope of a specification, as there is typically no indication as to how to control system bus power. One power management technique uses power gating to save power, but at the cost of slower wake latency. Current implementations of interfaces lack capabilities to meet demands of future generation always on (AON) capabilities for sensors and imaging.

DETAILED DESCRIPTION

In various embodiments, power management techniques are provided for bus-connected devices to enable improved functionality and reduced latencies to enter and exit low power states. In this way, bus-connected devices such as a master device that acts as a bus master for the bus can have faster wake capabilities. As such, devices can be placed into deeper low power modes (e.g., in which power consumption is on the order of approximately a few microwatts (µW)), and reduce entry and exit latencies with regard to such low power modes (e.g., to less than a few microseconds). Although the scope of the present invention is not limited in this regard, example buses may include a multi-drop bus such as a bus in accordance with the forthcoming I3C specification.

To realize particular low power states for a master device (which may also be referred to as a master, host controller, bus master, and/or main master), techniques may be used to transfer, inter alia, context, policy and role information to one or more secondary master devices before entry into a given low power state. By way of this role transfer, bus master responsibility is passed to such device(s). After this transfer has been effected, the secondary master device(s), upon sensing bus activity when the main master device is in a low power state, responds to bus transactions to reduce system latency. Note that a master device may prepare for entry into a low power state upon declaration of low activity on a bus and/or responsive to a software-driven low power state request. In one embodiment, a main master device may issue a direct bus command to a given secondary master/bridge device to indicate that it is willing to perform a role transfer negotiation. Such secondary device and bridge device are other hardware components coupled to the bus and including at least sufficient compute complexity to perform bus mastering functionality. Note that in some cases, these devices may include the same master control circuitry as present in the main master device, while in other cases the devices may include a lesser set of control circuitry that is still sufficient to perform at least a required amount of bus mastering functionality.

In addition, the master device may include a look ahead low power wake detection circuit, to detect a situation in which it is to exit the low power state. In an example, a master host controller may be required to wake depending on system requirements. In such case the master device may be enabled and wait for the wait detection circuit to match a pattern to declare a wake event. As another example, this wake detection circuit may detect whether a predefined signature, which is sent by a secondary master or bridge device, matches with a stored pattern (e.g., stored in a retention memory). This signature indicates when this other master is willing to return bus control and to wake the main master, such that a negotiation protocol for the master device to regain bus ownership can occur. Note that during a main master device low power state, the identified one or more secondary master or bridge devices may be configured to respond to incoming requests from connected (e.g., sensing) devices, to help in reducing wake latency and saving system power. Stated another way, the secondary master/bridge device is configured to handle communications on the bus, such as sensor data being sent by a coupled sensor device. As such, when active as bus master this device may receive incoming data communications via the bus and provide the communications to an intended destination, such as a host processor, which may couple to the secondary master device by one or more other interconnects, in some cases.

Responsive to a wake message, the wake detect circuit may be configured to send an indication to various components, including one or more power management units and system software to enable the main master device to exit the low power mode such it can execute a role transfer protocol to enable it to regain bus control from the secondary master or bridge device. Note embodiments may similarly be used for secondary and/or bridge devices to enter and exit low power states.

Figure 1:
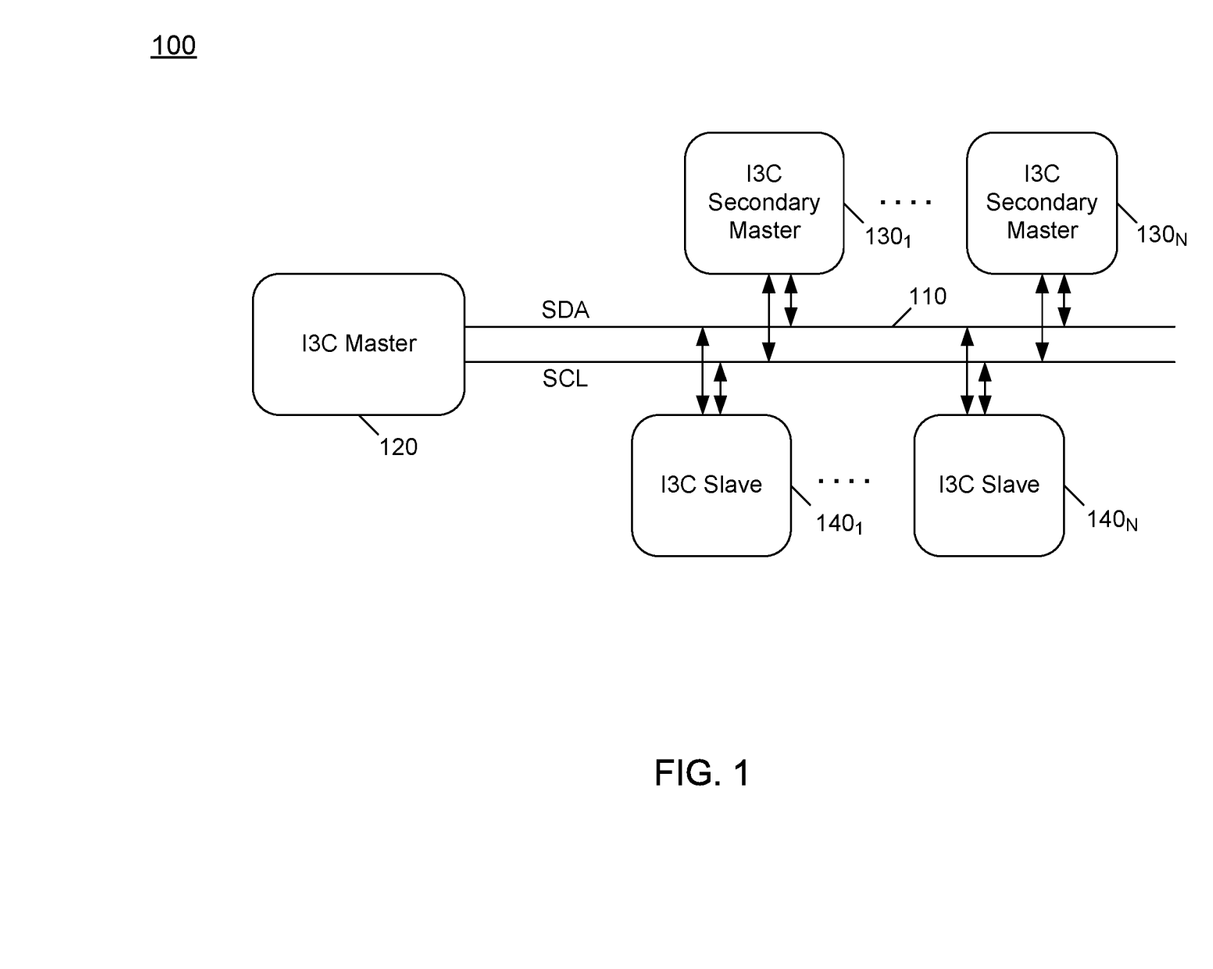
FIG. 1 is a block diagram of a system in accordance with an embodiment of the present invention.

Referring now to FIG. 1, shown is a block diagram of a system in accordance with an embodiment of the present invention. More specifically, system 100 shown in FIG. 1 represents at least a portion of any one of a variety of different types of computing devices. In different embodiments, such computing devices can range from relatively small low power devices such as a smartphone, tablet computer, wearable device or so forth, to larger devices such as laptop or desktop computers, server computers, automotive infotainment devices and so forth. In any case, system 100 includes a bus 110. In embodiments herein, bus 110 may be implemented as an I3C bus. However, understand the scope of the present invention is not limited in this regard and in other embodiments, bus 110 may be implemented as any type of multi-drop interconnect.

As illustrated, a primary or main master device 120 couples to bus 110. In various embodiments, master device 120 may be implemented as a host controller that includes hardware logic to act as a bus master for bus 110. Master device 120 may include a controller (not shown in the high level view of FIG. 1) to control data and clock signal integrity, as well as use (e.g.) internal current sources or passive pullups to hold bus 110 when all coupled devices are powered off. In some cases, master device 120 may be a relatively simple host controller for a low complexity bus or other multi-drop bus, such as in accordance with an $I^2C$ or I3C Specification. Other multi-drop interfaces such as Serial Peripheral Interface and/or Microwire also may be present in a particular embodiment.

In different implementations, master device 120 may be an interface circuit of a multicore processor or other system on chip (SoC), application processor or so forth. In other cases, master device 120 may be a standalone host controller (such as a given integrated circuit (IC)) or main master device for bus 110. And of course other implementations are possible. In other cases, master device 120 may be implemented as hardware, software, and/or firmware or combinations thereof, such as a dedicated hardware logic, e.g., a programmable logic, to perform bus master activities for bus 110.

Note that bus 110 is implemented as a two-wire bus in which a single serial line forms a data interconnect and another single serial line forms a clock interconnect. As such, data and clock communications can occur, e.g., in bidirectional manner. Master device 120 may be a relatively compute complex device (as compared to other devices on bus 110) that consumes higher power than other devices coupled to bus 110. As such, embodiments provide techniques to enable master device 120 to be placed into one or more low power states or modes when reduced activity is present on bus 110, to reduce power consumption. At the same time such techniques reduce latency for entry into and exit from such low power modes, in addition to providing one or more secondary master devices capable of performing bus master activities on bus 110.

To this end, as shown in FIG. 1, multiple secondary master devices $130_1$-$130_N$ are present. In various embodiments, secondary master devices 130 (generically) may be implemented as dedicated master or bridge devices such as standalone IC's coupled to bus 110. In other cases, these devices may be independent logic functionality of a SoC or other processor (and in some cases may be implemented in the same IC as master device 120 known as a secondary master). As will be described herein one or more such secondary master devices 130 may be controlled to act as bus master for bus 110 while main master device 120 is in a low power state, to enable bus operations to continue to proceed while in this low power state.

As further illustrated in FIG. 1, a plurality of slave devices $140_1$-$140_N$ also couple to bus 110. In different embodiments, slave devices 140 (generically) may take many different forms. For purposes of discussion herein, it may be assumed that slave devices 140 may be always on (AON) devices, such as sensors like micro-electrical mechanical systems (MEMS) or imaging sensors, or so forth. Understand while shown at this high level in the embodiment of FIG. 1, many variations and alternatives are possible.

Figure 2:
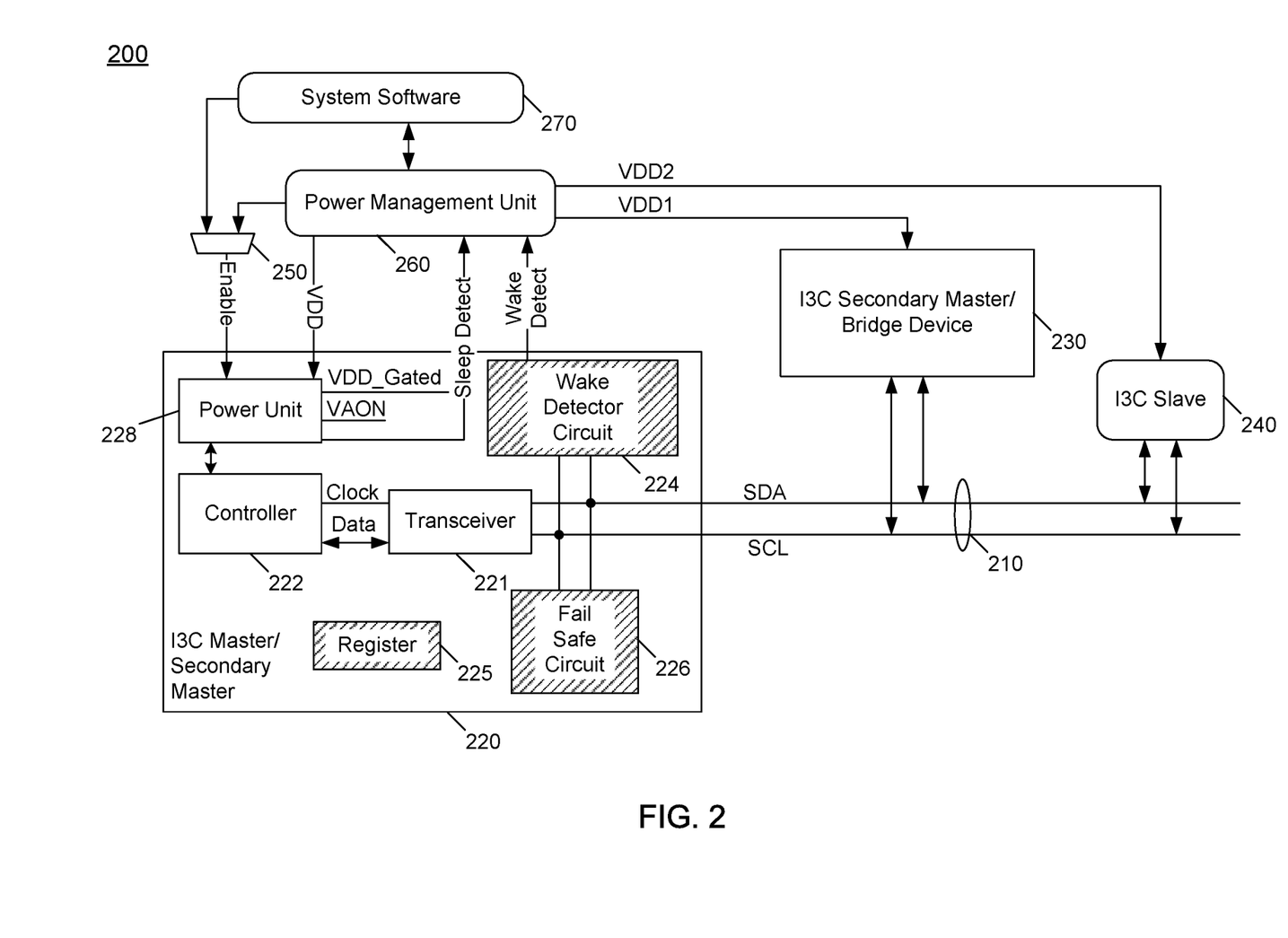
FIG. 2 is a block diagram of further details of a portion of a system in accordance with an embodiment of the present invention.

Referring now to FIG. 2, shown is a block diagram of further details of a portion of a system in accordance with an embodiment of the present invention. As shown in FIG. 2, system 200 may be any given type of computing device, similar to the discussion above. In the embodiment of FIG. 2 further system components and details of a main master/secondary master in accordance with an embodiment are shown. Thus in the illustration of FIG. 2, a bus 210 couples to a primary or main master 220 which may, in some modes of operation, be placed into a low power state, such that bus mastering activities are performed by a secondary master and/or bridge device 230, after an appropriate role transfer has occurred as described herein. Note further the presence of a representative slave device 240. As illustrated, slave device 240 couples between bus 210 and a power management unit 260. In various embodiments, power management unit 260 may be a platform-wide power controller, such as a power management integrated circuit (PMIC), although other variations are possible.

As further shown, system software 270, which in embodiments may take the form of one or more of an operating system (OS) and firmware, may communicate with power management unit 260. Furthermore, to enable power management activities as described herein one or both of system software 270 and power management unit 260 may provide control signals such as an enable signal, via a selection circuit 250 (which in an embodiment may be implemented as a multiplexer) to master device 220 (and more specifically to a power unit 228 within the master device).

Further illustrated in FIG. 2 are details of master device 220. In various embodiments, master device 220 may receive a supply voltage from power management unit 260 within power unit 228. As illustrated, power unit 228 may output multiple independent operating voltages from the received operating voltage. In the embodiment shown in FIG. 2, power unit 228 may output a gated operating voltage (VDD gated) and an always on operating voltage (VAON).

Master device 220 includes multiple independent domains. As used herein the term "domain" is used to mean a collection of hardware and/or logic that operates at the same voltage and frequency point. Depending upon mode of operation, a gated voltage domain includes devices powered by the gated operating voltage, and which may be placed in a low power state such that this operating voltage is not provided to these components. Instead, other components of master device 220 may operate in an always on voltage domain in which the always on operating voltage (VAON) is provided, regardless of whether the device is operating in low power state or an active state.

To this end, the always on voltage domain includes a wake detector circuit 224, a fail safe circuit 226, and a register 225, as indicated by cross-hatching in FIG. 2. In embodiments, fail safe circuit 226 may be configured to ensure that one or more bus characteristics are not changed during a wake/power on event. Of course in other embodiments additional or different components may be present within the always on voltage domain. A transceiver 221 that is configured to communicate clock and data information via bus 210 and a controller 222 may be present in the gated voltage domain, such that these components are placed into a low power mode and do not receive an operating voltage when master device 220 is in a low power state. Note that handshaking signals may be communicated between power unit 228 and controller 222 during power management operations as described herein.

As further illustrated in FIG. 2, wake detector circuit 224 may be configured to provide a wake detection signal to power management unit 260 responsive to detecting activity on bus 210 when master device 220 is in a low power state. Wait detector circuit 224 may be configured to identify a predetermined data signature communicated on bus 210 (as compared to a stored signature present in register 225) to identify a request to exit the low power state. Note that this signature pattern sent by secondary master/bridge device 230 indicates that the device is willing to transfer the bus master role back to the main master device.

As further illustrated, power unit 228 is configured to provide a sleep detection signal to power management unit 260. This sleep detection signal may be communicated when a host/master has completed a preparation mode, such that its context has been transferred to a secondary device and when an acknowledgement is received from secondary master/bridge device 230. Power management unit 260 may be configured to provide operating voltages (which may be at independent levels) to secondary master/bridge device 230 and slave device 240. Understand while shown at this high level in the embodiment of FIG. 2, many variations and alternatives are possible.

Figure 3:
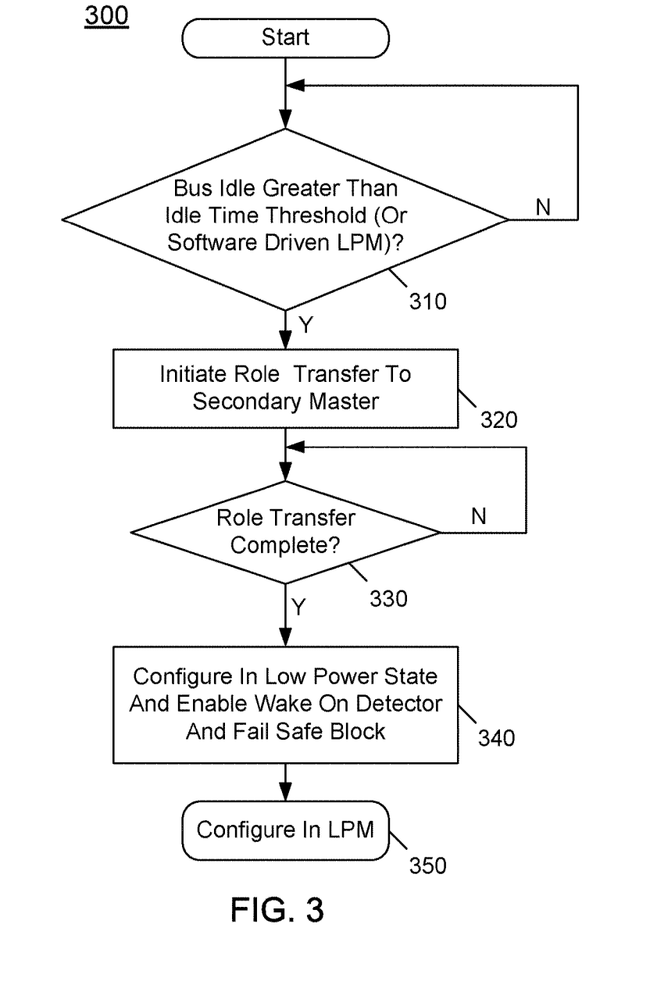
FIG. 3 is a flow diagram of a method in accordance with an embodiment of the present invention.

Referring now to FIG. 3, shown is a flow diagram of a method in accordance with an embodiment of the present invention. More specifically, method 300 shown in FIG. 3 is a method for performing a role transfer operation to cause a primary or main master device to be placed into a low power state after a role transfer that passes bus master responsibility to one or more secondary devices. In various embodiments, method 300 may be performed by hardware, software, and/or firmware or combinations thereof. As illustrated, method 300 begins by determining whether a bus has been idle for greater than an idle time threshold (diamond 310). In embodiments, this idle time threshold may be a controllable configuration parameter of a system. In different embodiments, such threshold value may be set between approximately a few milliseconds to a few seconds, depending on programming. As further shown, the determination at diamond 310 may also include whether a software-driven low power mode (LPM) has been initiated. In embodiments, this LPM initiation may occur responsive to a low power mode request from given system software such as an OS or firmware. If the bus has been idle for greater than the idle time threshold or a software-driven LPM request is received, control passes to block 320 where a role transfer may be initiated to transfer bus master activities to at least one secondary master device.

In an embodiment, the master device may receive an acknowledgement from the secondary device and responsive to this acknowledgment initiate the role transfer, where the main master device transfers various information. In one embodiment, this information transfer may include device characteristic information, system, device and bus policy information and address information. In addition, bus characteristic information may also be communicated. In an embodiment, such information may include number of active devices on the bus, capacitance of the devices, device policy, addresses, how long the master device will be in the low power mode, and so forth. Thereafter, control passes to diamond 330 to determine whether this role transfer has completed. Upon completion of this role transfer, control passes to block 340 where the main master device may be configured into a low power state in which its gated voltage domain can be powered down and at least certain components within an always on voltage domain, namely a wake detection circuit and a fail safe circuit, remain enabled in order to not change bus characteristics during LPM and wake up events. In one embodiment, after completion of the role transfer, system software may cause one or more voltages of the main master device to be disabled, while maintaining an AON voltage to be provided to the AON domain. Thereafter, control passes to block 350 where the main master device (namely its AON domain) may operate in LPM.

Figure 4:
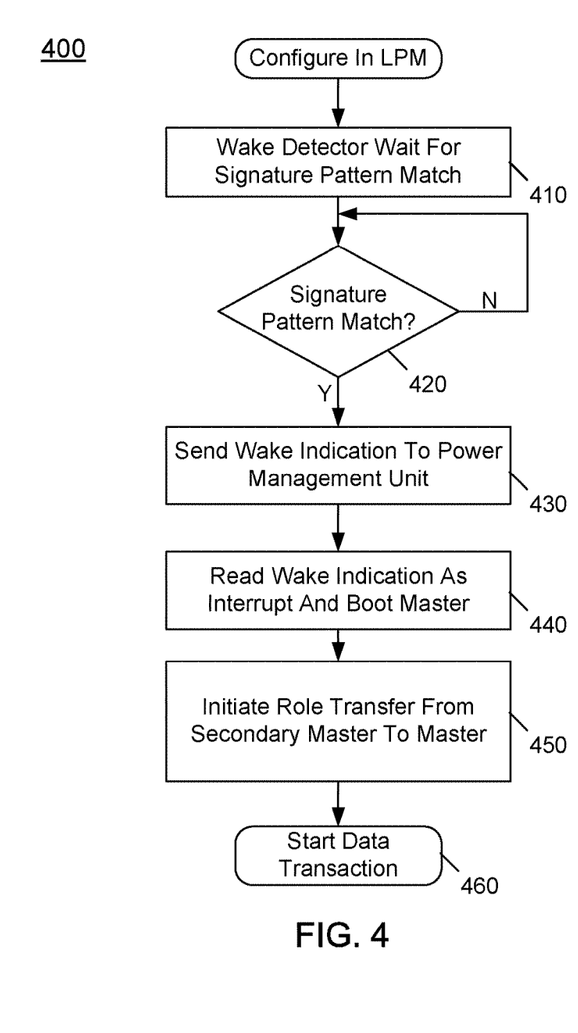
FIG. 4 is a flow diagram of a method in accordance with another embodiment of the present invention

Referring now to FIG. 4, shown is a flow diagram of a method in accordance with another embodiment of the present invention. More specifically as shown in FIG. 4, method 400 is a method for reconfiguring a main master device to have bus master responsibility after exit from a low power mode. In various embodiments, method 400 may be performed by hardware, software, and/or firmware or combinations thereof. As illustrated, method 400 begins by waiting for a predetermined signature pattern to be matched (block 410). Such determination may be performed by a wake detection circuit within the master device that is in an always on state. In an embodiment, this predetermined signature pattern may be stored in an always on storage such as a register within the same always on domain. Referring now to Table 1 below, shown is an example signature pattern (referred to as REQSMRHTM), which may be sent by a secondary master/bridge device as an indication of willingness to effect a role transfer back to the main master device. Of course, understand that different signature patterns are possible in other embodiments.

TABLE 1

| S | 1111110 (Command) | 10011010 (Command) | 1 Sr | 00000001 (Address) |
| --- | --- | --- | --- | --- |

If it is determined at diamond 420 that the signature pattern matches this stored signature value, control passes to block 430. At block 430 a wake indication may be sent to one or more power management units. For example, with reference back to FIG. 2, a wake detection signal is sent from wake detector circuit 224 to power management unit 260. In turn, power management unit 260 may send a corresponding signal to system software 270, which may cause initiation of a role transfer back to the main master device.

As further illustrated in FIG. 4, control next passes to block 440 where a wake indication may be read, e.g., by the system software as an interrupt. Responsive to this interrupt, the master device may be appropriately booted. For example, an enable signal may cause an internal power controller of the main master device to power up the gated voltage domain and perform initialization activities. Thereafter, at block 450 bus control by the master device may be initiated by initiating a role transfer of bus master activities from the secondary master device to the main master device. After completing a role transfer, the main master device may be configured to start holding bus ownership and control bus transactions. Accordingly, at block 460 data transactions may begin under bus mastering control of the master device. Understand while shown at this high level in the embodiment of FIG. 4, many variations and alternatives are possible.

Figure 5:
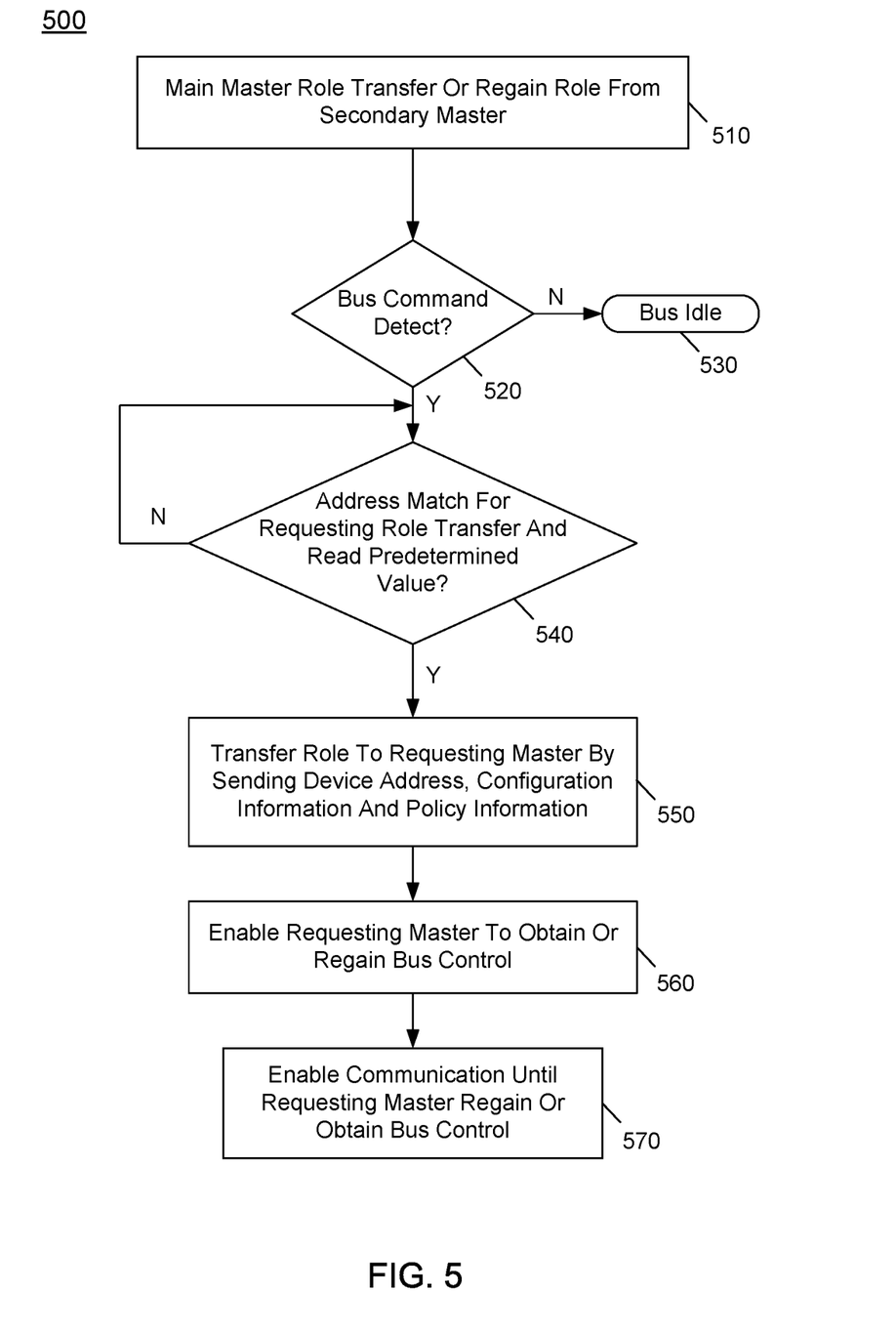
FIG. 5 is a flow diagram of a method in accordance with yet another embodiment of the present invention.

Referring now to FIG. 5, shown is a flow diagram of a method in accordance with yet another embodiment of the present invention. As illustrated, method 500 is a method for transferring bus control between a main master device and one or more secondary master devices. In various embodiments, method 500 may be performed by hardware, software, and/or firmware or combinations thereof. Method 500 begins by performing a role transfer from a main master device to a secondary master device, or vice versa (block 510). Thereafter at diamond 520 it is determined whether a bus command is detected. If not, control passes to block 530 where the bus may be placed into an idle state.

Instead if a bus command is detected, control passes to diamond 540. At diamond 540 it may be determined whether an address matches for requesting a role transfer and a read value is a predetermined value (e.g., a logic one). If so, control passes to block 550 where a role transfer is performed. More specifically, this role transfer may be to a requesting master and can be performed by sending a device address, configuration information and policy information. Thereafter at block 560 the requesting master may obtain or regain bus control after appropriate configuration with the received address, configuration and policy information. Next, control passes to block 570 where communications on the bus may proceed under control of bus master activities by this active master device, until another requesting master regains or obtains bus control. Understand while shown at this high level in the embodiment of FIG. 5, many variations and alternatives are possible.

Using an embodiment, system power may be saved by transferring role responsibility to a secondary master (which may have reduced power consumption as compared to a main master device (e.g., power consumption of the secondary device may be on the order of approximately 1-10 μW or below)). This role transfer may also enable reduced exit latency to, e.g., below a few tens of microseconds. Embodiments may thus manage system power without impacting system wake latency by transferring a bus master role to one or more secondary master/bridge devices. Such secondary master/bridge devices may be configured to control the bus during any sensing activity by connected devices without powering on the main master device. Embodiments may thus save system power aggressively and help in reducing wake latency by transferring bus master role to a secondary master. In this way, embodiments may help in saving SoC power and meeting faster latency requirements for always-on imaging and sensor devices, among other connected devices.

Figure 6:
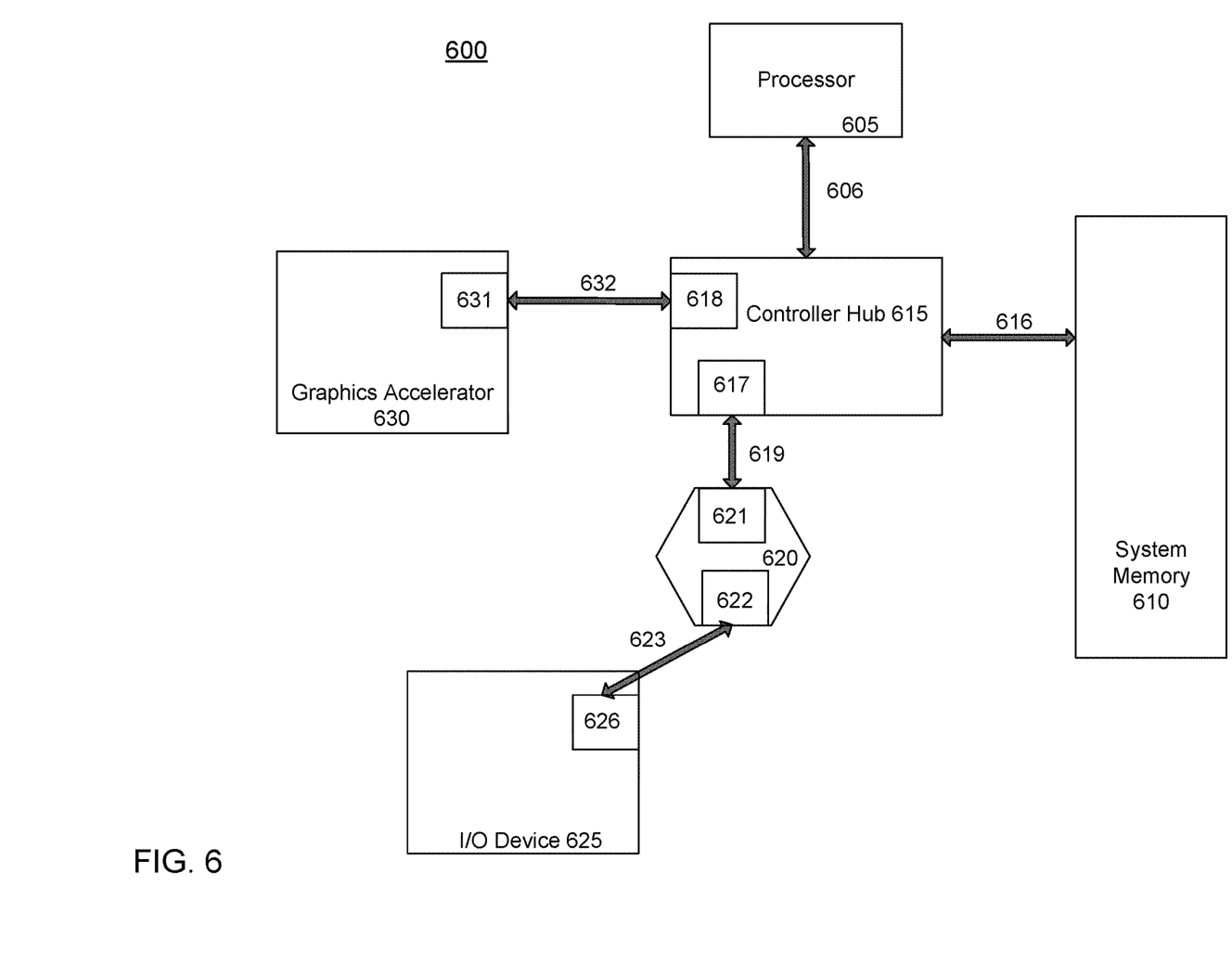
FIG. 6 is an embodiment of a fabric composed of point-to-point links that interconnect a set of components.

Embodiments may be implemented in a wide variety of interconnect structures. Referring to FIG. 6, an embodiment of a fabric composed of point-to-point links that interconnect a set of components is illustrated. System 600 includes processor 605 and system memory 610 coupled to controller hub 615. Processor 605 includes any processing element, such as a microprocessor, a host processor, an embedded processor, a co-processor, or other processor. Processor 605 is coupled to controller hub 615 through front-side bus (FSB) 606. In one embodiment, FSB 606 is a serial point-to-point interconnect. In another embodiment, link 606 includes a parallel serial, differential interconnect architecture that is compliant with different interconnect standards, and which may couple with one or more host controllers to perform dynamic role transfers of bus mastering activities as described herein.

System memory 610 includes any memory device, such as random access memory (RAM), non-volatile (NV) memory, or other memory accessible by devices in system 600. System memory 610 is coupled to controller hub 615 through memory interface 616. Examples of a memory interface include a double-data rate (DDR) memory interface, a dual-channel DDR memory interface, and a dynamic RAM (DRAM) memory interface.

In one embodiment, controller hub 615 is a root hub, root complex, or root controller in a PCIe interconnection hierarchy. Examples of controller hub 615 include a chip set, a memory controller hub (MCH), a northbridge, an interconnect controller hub (ICH), a southbridge, and a root controller/hub. Often the term chip set refers to two physically separate controller hubs, i.e. a memory controller hub (MCH) coupled to an interconnect controller hub (ICH). Note that current systems often include the MCH integrated with processor 605, while controller 615 is to communicate with I/O devices, in a similar manner as described below. In some embodiments, peer-to-peer routing is optionally supported through root complex 615.

Here, controller hub 615 is coupled to switch/bridge 620 through serial link 619. Input/output modules 617 and 621, which may also be referred to as interfaces/ports 617 and 621, include/implement a layered protocol stack to provide communication between controller hub 615 and switch 620. In one embodiment, multiple devices are capable of being coupled to switch 620.

Switch/bridge 620 routes packets/messages from device 625 upstream, i.e., up a hierarchy towards a root complex, to controller hub 615 and downstream, i.e., down a hierarchy away from a root controller, from processor 605 or system memory 610 to device 625. Switch 620, in one embodiment, is referred to as a logical assembly of multiple virtual PCI-to-PCI bridge devices. Device 625 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices and which may be coupled via an I3C bus, as an example. Often in the PCIe vernacular, such a device is referred to as an endpoint. Although not specifically shown, device 625 may include a PCIe to PCI/PCI-X bridge to support legacy or other version PCI devices. Endpoint devices in PCIe are often classified as legacy, PCIe, or root complex integrated endpoints.

Graphics accelerator 630 is also coupled to controller hub 615 through serial link 632. In one embodiment, graphics accelerator 630 is coupled to an MCH, which is coupled to an ICH. Switch 620, and accordingly I/O device 625, is then coupled to the ICH. I/O modules 631 and 618 are also to implement a layered protocol stack to communicate between graphics accelerator 630 and controller hub 615. A graphics controller or the graphics accelerator 630 itself may be integrated in processor 605.

Figure 7:
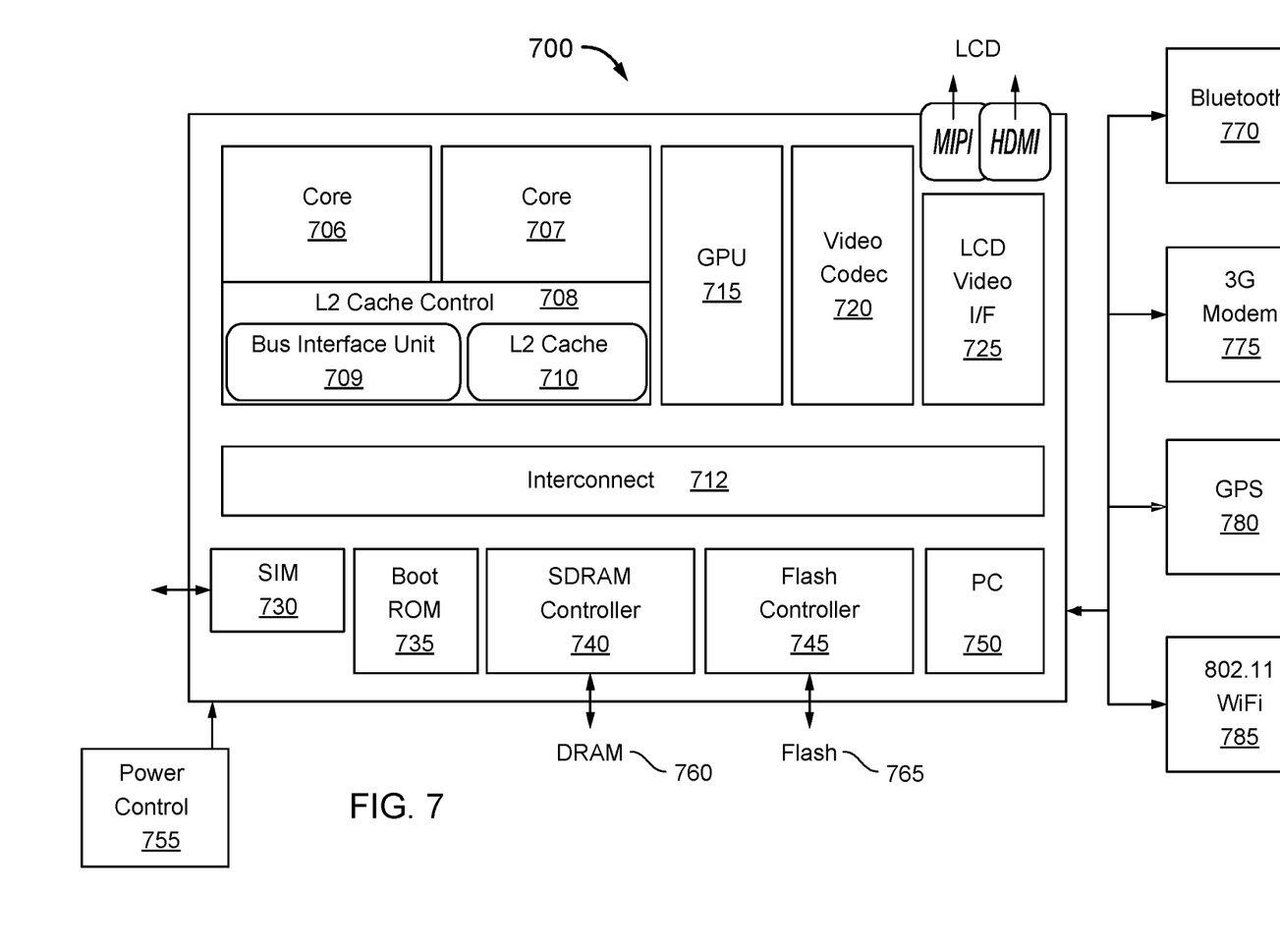
FIG. 7 is an embodiment of a system-on-chip design in accordance with an embodiment.

Turning next to FIG. 7, an embodiment of a SoC design in accordance with an embodiment is depicted. As a specific illustrative example, SoC 700 may be configured for insertion in any type of computing device, ranging from portable device to server system. Here, SoC 700 includes 2 cores 706 and 707. Cores 706 and 707 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 706 and 707 are coupled to cache control 708 that is associated with bus interface unit 709 and L2 cache 710 to communicate with other parts of system 700 via an interconnect 712.

Interconnect 712 provides communication channels to the other components, such as a Subscriber Identity Module (SIM) 730 to interface with a SIM card, a boot ROM 735 to hold boot code for execution by cores 706 and 707 to initialize and boot SoC 700, a SDRAM controller 740 to interface with external memory (e.g., DRAM 760), a flash controller 745 to interface with non-volatile memory (e.g., flash 765), a peripheral controller 750 (e.g., an eSPI interface) to interface with peripherals, video codecs 720 and video interface 725 to display and receive input (e.g., touch enabled input), GPU 715 to perform graphics related computations, etc. Any of these interconnects/interfaces may incorporate aspects described herein, including dynamic role transfers of bus mastering activities. In addition, the system illustrates peripherals for communication, such as a Bluetooth module 770, 3G modem 775, GPS 780, and WiFi 785. Also included in the system is a power controller 755.

Figure 8:
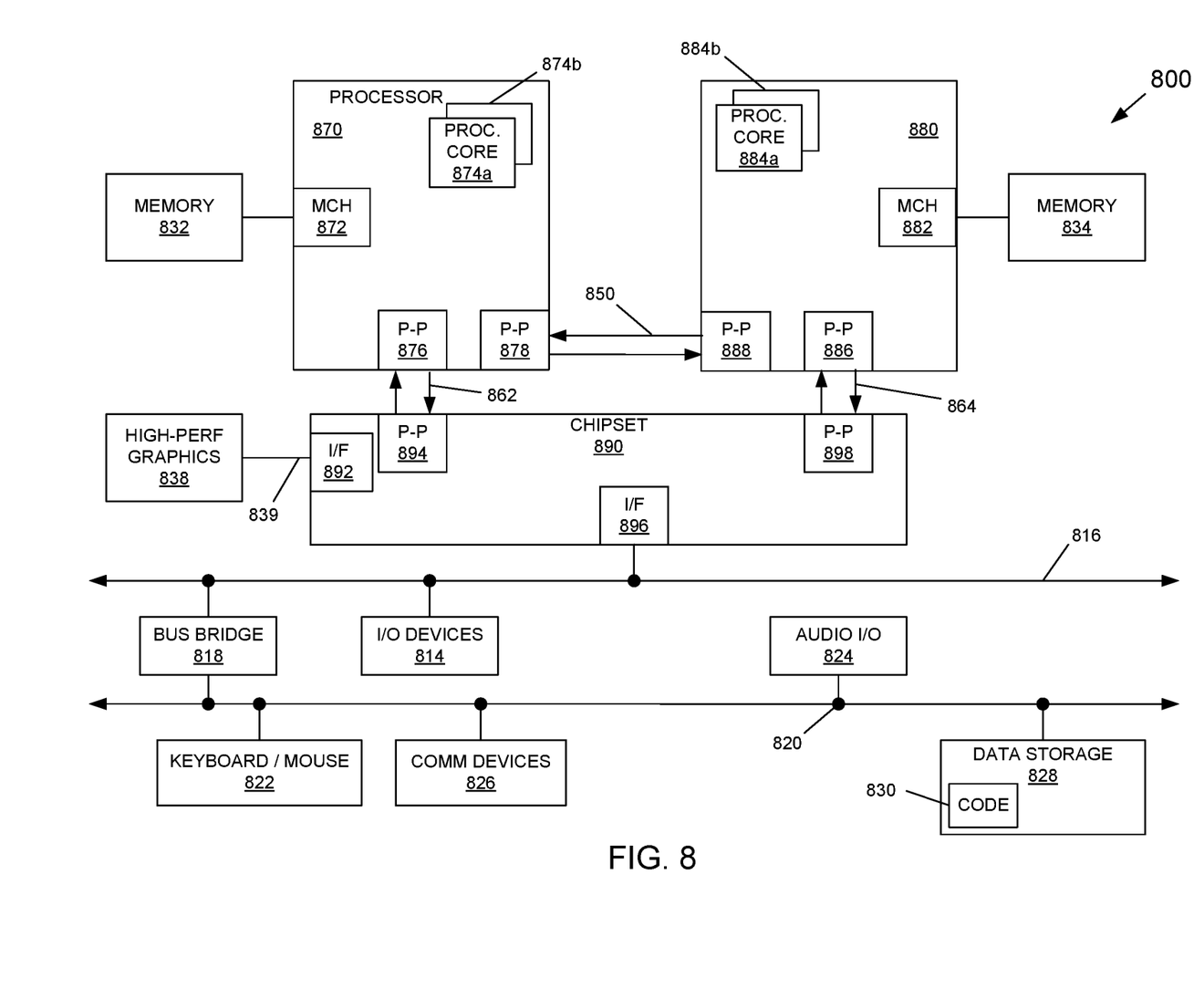
FIG. 8 is a block diagram of a system in accordance with an embodiment of the present invent

Referring now to FIG. 8, shown is a block diagram of a system in accordance with an embodiment of the present invention. As shown in FIG. 8, multiprocessor system 800 includes a first processor 870 and a second processor 880 coupled via a point-to-point interconnect 850. As shown in FIG. 8, each of processors 870 and 880 may be many core processors including representative first and second processor cores (i.e., processor cores 874a and 874b and processor cores 884a and 884b).

Still referring to FIG. 8, first processor 870 further includes a memory controller hub (MCH) 872 and point-to-point (P-P) interfaces 876 and 878. Similarly, second processor 880 includes a MCH 882 and P-P interfaces 886 and 888. As shown in FIG. 8, MCH's 872 and 882 couple the processors to respective memories, namely a memory 832 and a memory 834, which may be portions of system memory (e.g., DRAM) locally attached to the respective processors. First processor 870 and second processor 880 may be coupled to a chipset 890 via P-P interconnects 862 and 864, respectively. As shown in FIG. 8, chipset 890 includes P-P interfaces 894 and 898.

Furthermore, chipset 890 includes an interface 892 to couple chipset 890 with a high performance graphics engine 838, by a P-P interconnect 839. As shown in FIG. 8, various input/output (I/O) devices 814 may be coupled to first bus 816, along with a bus bridge 818 which couples first bus 816 to a second bus 820. Various devices may be coupled to second bus 820 including, for example, a keyboard/mouse 822, communication devices 826 and a data storage unit 828 such as a disk drive or other mass storage device which may include code 830, in one embodiment. Further, an audio I/O 824 may be coupled to second bus 820. Any of the devices shown in FIG. 8 may be configured to perform dynamic role transfers of bus master activities for one or more of the interconnect structures, as described herein.

The following Examples pertain to further embodiments.

In one example, a host device for operating an interconnect includes: a transceiver to communicate information on an interconnect, the interconnect to couple to the host device; a controller to control operation of the transceiver and to be a master for the interconnect; and a role transfer logic to cause a secondary device to be the master for the interconnect when the host device is to enter into a low power mode.

In an example, the role transfer logic is to cause the secondary device to be the master for the interconnect based at least in part on an activity level on the interconnect, the secondary device having a lower power consumption than the host device.

In an example, the role transfer logic is to send at least a portion of a context of the controller, policy information and interconnect characteristic information to the secondary device, to cause the secondary device to be the master for the interconnect.

In an example, the host device further comprises a wake detection circuit to identify a wake indication from the secondary device, to indicate that the secondary device is to transfer master responsibility for the interconnect to the controller.

In an example, the host device further comprises a control logic to prevent a change in one or more characteristics of the interconnect based at least in part on the wake detection circuit identification of the wake indication.

In an example, the host device further comprises a storage to store a pattern corresponding to the wake indication, where the wake detection circuit is to identify the wake indication when a communication on the interconnect matches the pattern.

In an example, the host device comprises a master device, the master device having a first voltage domain and a second voltage domain.

In an example, the first voltage domain comprises the wake detection circuit and the storage, and the second voltage domain comprises the transceiver and the controller.

In an example, the host device further comprises a power unit to: provide a first voltage to the first voltage domain, the first voltage comprising an always on voltage; and provide a second voltage to the second voltage domain, the second voltage to be disabled when the host device is in the low power mode.

In an example, the wake detection circuit is to send a wake signal to a power management unit responsive to the match, where the power management unit is to cause the controller to exit the low power mode responsive to the wake signal.

In an example, the power management unit is to inform a system software regarding the wake signal, the system software to instruct the power management unit to wake the apparatus.

In another example, a method includes: identifying a trigger for a master device to enter into a low power state, the master device a bus master for a bus; initiating a role transfer from the master device to a secondary device, the role transfer to cause bus master responsibility to be transferred from the master device to the secondary device; sending at least a portion of a context of the master device, configuration information and policy information from the master device to the secondary device; enabling a wake detection circuit of the master device; and causing the master device to enter into the low power state while the secondary device has the bus master responsibility.

In an example, the method further comprises preventing one or more bus characteristics to be changed during the role transfer.

In an example, the method further comprises: identifying a wake indication from the secondary device, via the wake detection circuit; and sending a signal to a power management unit to cause the master device to exit the low power state responsive to identifying the wake indication.

In an example, the method further comprises after exiting from the low power state, causing the master device to obtain the bus master responsibility from the secondary device.

In an example, the method further comprises handling in the secondary device one or more communications from a sensor coupled to the bus while the master device is in the low power state, without waking the master device from the low power state.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In yet another example, a system comprises: a host controller to couple to an interconnect to which a plurality of devices may be coupled. The host controller may include a first domain having: a first driver to drive first information onto the interconnect; and a master controller to be a bus master for the interconnect, where the master controller is to perform a role transfer to a second controller to enable the second controller to be the bus master for the interconnect while the host controller is in a low power state. The host controller may further include a second domain having a wake detection circuit to identify a wake indication from the second controller, to indicate that the second controller is to perform a second role transfer to cause the master controller to be the bus master for the interconnect. The system further includes the second controller to couple to the interconnect and to be a bus master for the interconnect, where the second controller has a lower power consumption level than the host controller. In addition, the system may further include at least one sensor to couple to the interconnect, where the second controller is to handle a communication from the at least one sensor while the host controller is in a low power state.

In an example, the main controller is to send at least a portion of a context of the main controller, policy information and interconnect characteristic information to the second controller before the host controller is to enter into the low power state.

In an example, the host controller further comprises a control logic to prevent a change in one or more characteristics of the interconnect based at least in part on the wake detection circuit identification of the wake indication.

In an example, the host controller further comprises a storage to store a pattern corresponding to the wake indication, where the wake detection circuit is to identify the wake indication when a communication on the interconnect matches the pattern.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A host device comprising:
    a transceiver to communicate information on an interconnect, the interconnect to couple to the host device;
    a controller to control operation of the transceiver and to be a master for the interconnect; and
    a role transfer logic to cause a secondary device to be the master for the interconnect when at least a portion of the host device is to enter into a low power mode, wherein the role transfer logic is to cause the secondary device to be the master for the interconnect based at least in part on an activity level on the interconnect, the secondary device having a lower power consumption than the host device.

2. The host device of claim 1, wherein the role transfer logic is to send at least a portion of a context of the controller, policy information and interconnect characteristic information to the secondary device, to cause the secondary device to be the master for the interconnect.

3. The host device of claim 1, further comprising a wake detection circuit to identify a wake indication from the secondary device, to indicate that, after the secondary device is caused to be the master for the interconnect, the secondary device is to transfer master responsibility for the interconnect back to the controller.

4. The host device of claim 3, further comprising a control logic to prevent a change in one or more characteristics of the interconnect based at least in part on the wake detection circuit identification of the wake indication.

5. The host device of claim 3, further comprising a storage to store a pattern corresponding to the wake indication, wherein the wake detection circuit is to identify the wake indication when a communication on the interconnect matches the pattern.

6. The host device of claim 5, wherein the host device comprises a master device, the master device having a first voltage domain and a second voltage domain.

7. The host device of claim 6, wherein the first voltage domain comprises the wake detection circuit and the storage, and the second voltage domain comprises the transceiver and the controller.

8. The host device of claim 7, wherein the host device further comprises a power unit to:
   provide a first voltage to the first voltage domain, the first voltage comprising an always on voltage; and
   provide a second voltage to the second voltage domain, the second voltage to be disabled when the apparatus is in the low power mode.

9. The host device of claim 5, wherein the wake detection circuit is to send a wake signal to a power management unit responsive to the match, wherein the power management unit is to cause the controller to exit the low power mode responsive to the wake signal.

10. The host device of claim 9, wherein the power management unit is to inform a system software regarding the wake signal, the system software to instruct the power management unit to wake the host device.

* * * * *